United States Patent
Schulz et al.

(10) Patent No.: US 8,018,187 B2
(45) Date of Patent: Sep. 13, 2011

(54) INITIAL POLARITY DETECTION FOR PERMANENT MAGNET MOTOR DRIVES

(75) Inventors: Steven E. Schulz, Torrance, CA (US); Constantin C. Stancu, Anaheim, CA (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 425 days.

(21) Appl. No.: 12/348,684

(22) Filed: Jan. 5, 2009

(65) Prior Publication Data

US 2010/0171455 A1 Jul. 8, 2010

(51) Int. Cl.
*H02P 1/46* (2006.01)
(52) U.S. Cl. ......... 318/400.33; 318/400.02; 318/400.32; 318/716; 318/722
(58) Field of Classification Search ............. 318/400.23, 318/400.02, 400.09, 400.32, 716, 722; 388/800; 706/23

See application file for complete search history.

(56) References Cited

U.S. PATENT DOCUMENTS

| | | | |
|---|---|---|---|
| 5,248,922 A * | 9/1993 | Meshkat | 318/560 |
| 6,438,321 B1 * | 8/2002 | Lin | 388/800 |
| 6,904,422 B2 * | 6/2005 | Calise et al. | 706/23 |
| 7,418,432 B2 * | 8/2008 | Calise et al. | 706/23 |
| 2002/0099677 A1 * | 7/2002 | Calise et al. | 706/23 |
| 2004/0104704 A1 * | 6/2004 | Hirono | 318/722 |
| 2006/0125439 A1 * | 6/2006 | Ajima et al. | 318/716 |
| 2009/0322268 A1 * | 12/2009 | Imamura et al. | 318/400.23 |
| 2010/0017063 A1 * | 1/2010 | Maeda | 701/42 |

* cited by examiner

*Primary Examiner* — Paul Ip
(74) *Attorney, Agent, or Firm* — Ingrassia Fisher & Lorenz, P.C.

(57) ABSTRACT

Methods and apparatus are provided for aligning a control reference axis with a magnetic north of a permanent magnet motor. The method includes the steps of injecting a predetermined stator current on an estimated reference axis of the permanent magnet motor and introducing predetermined error on the estimated reference axis. The method further includes the steps of determining if a speed of the permanent magnet motor is greater than a predetermined threshold speed and setting the control reference axis to 180° added to the estimated reference axis if the speed of the permanent magnet motor is greater than the predetermined threshold speed or setting the control reference axis to the estimated reference axis if the speed of the permanent magnet motor is less than or equal to the predetermined threshold speed.

20 Claims, 5 Drawing Sheets

INITIAL POLARITY DETECTION FOR PERMANENT MAGNET MOTOR DRIVES

TECHNICAL FIELD

The present invention generally relates to permanent magnet motor drives, and more particularly relates to a method for initial polarity detection for permanent magnet motor drives.

BACKGROUND OF THE INVENTION

Vector control is a common technique used in the control of high performance motor drives. The principle of vector control relies on orientation of the synchronous reference frame with one of the fluxes of the machine (either stator or rotor flux). Proper control and torque production of the machine relies on accurate alignment of the synchronous reference frame to the desired motor flux, such as accurate alignment with the rotor magnet north pole. Incorrect alignment will result in erroneous torque production, and possible instability of current control. It is therefore imperative that an accurate and reliable method of rotor alignment be selected.

If a mechanical position sensing device is employed, such as a resolver, the device can be aligned at the factory to the rotor magnet north pole. However, some systems do not employ a position sensing device. Rather, a position sensorless control algorithm is used to estimate the rotor position based upon machine quantities such as currents and voltages. Many such position sensorless control techniques exist, and most are based upon detecting the saliency of the motor. The saliency of the motor is the variation of spatial inductance of the motor around the circumference of the airgap. For example, in an interior permanent magnet (IPM) motor, the rotor magnets are buried in the rotor. This results in different D and Q axis inductances (or saliency). While conventional techniques exist to detect this saliency, and hence provide rotor position information, these prior art techniques typically cannot differentiate between the positive and negative D axis (i.e., the rotor magnet north and south poles). Typically, a second technique is employed to resolve the proper alignment with the north pole once the positive or negative D axis has been identified. These typical techniques, however, generally involve significant computations and/or considerable time.

Accordingly, it is desirable to provide a method and apparatus for simply and reliably resolving the rotor magnet pole orientation. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for aligning a control reference axis with a magnetic north of a permanent magnet motor. The method includes the steps of injecting a predetermined stator current on an estimated reference axis of the permanent magnet motor and introducing predetermined error on the estimated reference axis. The method further includes the steps of determining if a speed of the permanent magnet motor is greater than a predetermined threshold speed and setting the control reference axis to 180° added to the estimated reference axis if the speed of the permanent magnet motor is greater than the predetermined threshold speed.

In addition, a sensorless vector control is provided for initializing a rotor position signal corresponding to a position of a rotor for a permanent magnet motor. The sensorless vector control includes a stator current injector, an error signal generator, and a vector initializer. The stator current injector injects a predetermined stator current on an estimated reference axis of the permanent magnet motor. The error signal generator is coupled to the stator current injector and provides an error signal to the stator current injector for introducing predetermined error on the estimated reference axis. The vector initializer determines if a speed of the permanent magnet motor is greater than a predetermined threshold speed after the predetermined error is introduced, the vector initializer setting the control reference axis for the position sensorless vector control to 180° added to the estimated reference axis if the speed of the permanent magnet motor is greater than the predetermined threshold speed and setting the control reference axis for the position sensorless vector control to the estimated reference axis if the speed of the permanent magnet motor is less than or equal to the predetermined threshold speed.

An electric motor system is also provided, the electric motor system including an interior permanent magnet (IPM) motor, an inverter, a sensorless vector control, and an inverter controller. The IPM motor has a magnetic north associated therewith. The inverter is coupled to the IPM motor and provides motor control signals to the IPM motor for controlling its operation. The sensorless vector control is coupled to the IPM motor and determines a position of a rotor of the IPM motor and generates a rotor position signal and an angular speed signal in response to the saliency of the IPM motor. And the inverter controller is coupled to the sensorless vector control controller and the inverter for generating operational control signals in response to the rotor position signal and the angular speed signal, the inverter controller providing the operational control signals to the inverter for controlling the operation thereof. The sensorless vector control includes a stator current injector, an error signal generator, a vector initializer, and a rotor position determiner. The stator current injector injects a predetermined stator current on an estimated reference axis of the IPM motor. The error signal generator is coupled to the stator current injector and provides an error signal to the stator current injector for introducing predetermined error on the estimated reference axis. The vector initializer determines if an angular speed of the IPM motor is greater than a predetermined threshold speed after the predetermined error is introduced and sets a control reference axis to 180° added to the estimated reference axis if the speed of the IPM motor is greater than the predetermined threshold speed. And the rotor position determiner is coupled to the vector initializer and the IPM motor and determines the position of the rotor of the IPM motor in response to the control reference axis and the saliency of the IPM motor.

DESCRIPTION OF THE DRAWINGS

The present invention will hereinafter be described in conjunction with the following drawing figures, wherein like numerals denote like elements.

FIG. 7, including FIGS. 7A and 7B, illustrate graphs of speed, D-axis current command, and estimated rotor position plus offset of an interior permanent magnet motor using the initial polarity detection routine of FIG. 6 in accordance with the embodiment of the present invention, wherein FIG. 7A depicts an interior permanent magnet motor where the initial rotor position estimate is correctly aligned to the rotor magnet north pole, and FIG. 7B depicts an interior permanent magnet motor where the initial rotor position estimate is incorrectly aligned to the rotor magnet south pole.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
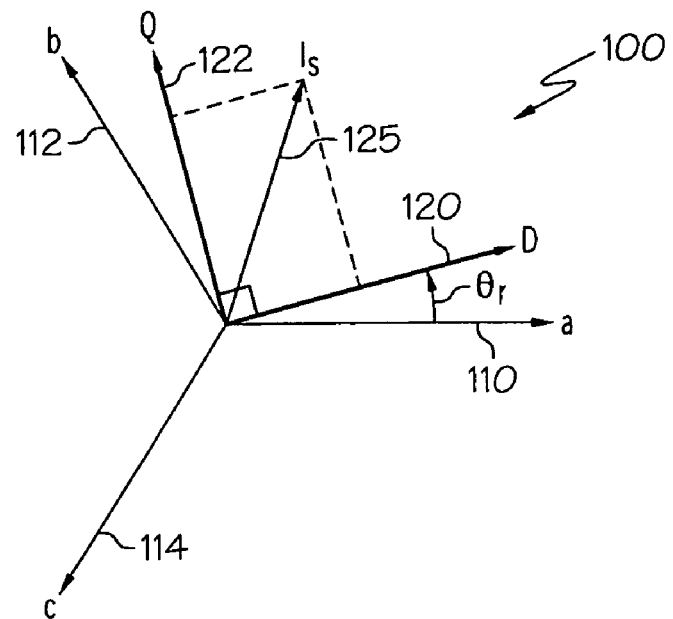
FIG. 1 illustrates a vector diagram of both stationary and synchronous reference frames.

In the existing technology, vector control is a common technique used in the control of high performance electric motor systems wherein machine quantities such as voltages and currents are treated as space vectors. Referring to FIG. 1, a vector diagram 100 illustrates a stationary, three-dimensional reference frame having axis 110, 112 and 114. In regards to electric motor system vector control, the motor is often modeled as a two phase equivalent of the three-dimensional reference frame called a synchronous reference frame. The principle of vector control relies on orientation of the synchronous reference frame with one of the fluxes of the machine (either the stator flux or the rotor flux). The synchronous reference frame includes two orthogonal axes, the D axis 120 referred to as the direct axis and the Q axis 122 referred to as the quadrature axis. When the synchronous reference frame is rotating at the electrical excitation frequency, the voltage and current quantities become direct current quantities in the synchronous frame (assuming steady-state sinusoidal operation) and the synchronous reference frame (D and Q axes 120, 122) will rotate at the same angular velocity as a stator current vector $I_s$ 125.

For an interior permanent magnet (IPM) motor, the D axis is typically aligned to the rotor magnet north pole and the motor stator voltage equations can be represented as shown in Equations 1 and 2, where, in the synchronous reference frame, Equation 1 is the D axis stator voltage equation and Equation 2 is the Q axis stator voltage. Corresponding thereto, Equation 3 is the D axis stator flux $\lambda_{ds}^e$ and Equation 4 is the Q axis stator flux $\lambda_{qs}^e$.

$$V_{ds}^e = R_s i_{ds}^e + \frac{d\lambda_{ds}^e}{dt} - \omega_r \lambda_{qs}^e \quad (1)$$

$$V_{qs}^e = R_s i_{qs}^e + \frac{d\lambda_{qs}^e}{dt} + \omega_r \lambda_{ds}^e \quad (2)$$

$$\lambda_{ds}^e = L_d i_{ds}^e + \lambda_f \quad (3)$$

$$\lambda_{qs}^e = L_q i_{qs}^e \quad (4)$$

In Equations 1 to 4, $\omega_r$ represents the angular velocity of the rotor of the IPM motor in the electrical reference frame, $R_s$ is the stator resistance thereof, $\lambda_f$ is the magnet flux, $L_d$ and $L_q$ are the D and Q axis inductances, $V_{ds}^e$ and $V_{qs}^e$ are the D and Q axis stator voltages, and $i_{ds}^e$ and $i_{qs}^e$ are the D and Q axis stator currents. The superscript "e" in Equations 1 to 4 refers to the excitation or synchronous reference frame. The torque of the IPM motor can be represented as shown in Equation 5:

$$T_e = \frac{3p}{4}(\lambda_{ds}^e i_{qs}^e - \lambda_{qs}^e i_{ds}^e) \quad (5)$$

where p is the number of machine poles. Proper control and torque production of the motor relies on accurate alignment of the synchronous reference frame to the desired motor flux, such as the rotor magnet north pole. Incorrect alignment will result in erroneous torque production, and possible instability of current control. It is therefore imperative that an accurate and reliable method of rotor alignment be selected.

If a mechanical position sensing device is employed, such as a resolver, the device can be aligned at the factory to the rotor magnet north pole. However, some systems do not employ a position sensing device. Rather, a vector sensorless control is used to estimate the rotor position based upon machine quantities such as currents and voltages and is typically based upon detecting the saliency of the machine. The saliency is the variation of spatial inductance of the motor around the circumference of an airgap around the motor. In an IPM motor, the rotor magnets are buried in the rotor, resulting in different D and Q axis inductances (or saliency). While detection of saliency can provide rotor position information, this rotor position information typically does not differentiate between the positive and negative D axis (i.e., the rotor magnet north and south poles). The present invention provides a simple and effective alternative method for resolving the rotor magnet pole orientation for proper alignment with the north pole once the positive or negative D axis has been identified.

Utilizing saturation characteristics of an IPM synchronous motor, when the stator current vector is aligned with the estimated +D axis the reluctance flux will contribute to the permanent magnet flux (see Equation 1), thereby increasing the saturation of the IPM motor. With appropriate current amplitude, virtually flat torque versus angular position characteristics can be achieved over a fairly wide position span. However, when the stator current vector is aligned with the estimated −D axis, the torque versus stator current position has a very steep gain.

Figure 2:
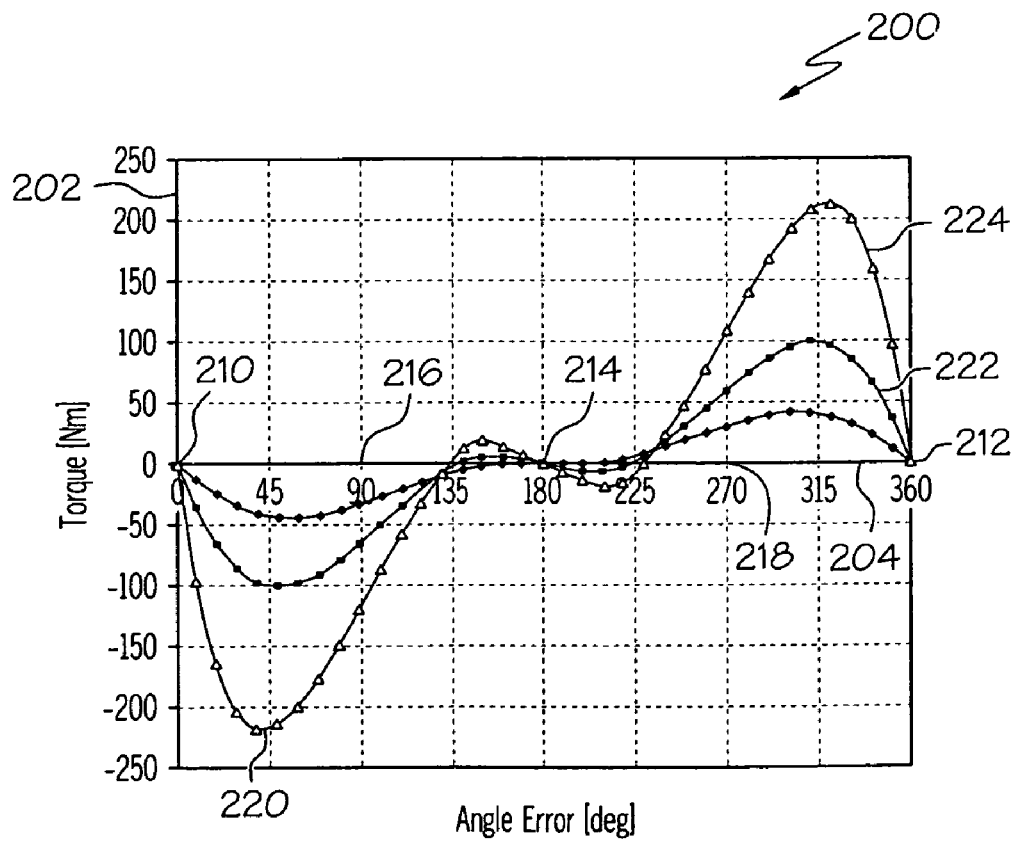
FIG. 2 illustrates a graph of motor torque versus angle error for an internal permanent magnet motor.

Referring to FIG. 2, a graph 200 shows the measured torque versus angle error plot for a typical IPM type motor where a fixed amplitude stator current was commanded in the −D axis. The torque is plotted on the y-axis 202 and the angle error is plotted on the x-axis 204. After aligning the synchronous reference frame with the rotor magnet north pole, the angular error was introduced into the reference frame alignment while recording torque. Zero and 360 degree angular error 210, 212 are when the stator current vector is on the −D axis, while 180 degree angular error 214 is when the stator current vector is on the +D axis. Ninety and 270 degree angular error 216, 218 correspond to the −Q and +Q axes, respectively. Each curve 220, 222, 224 represents a different amplitude of current injection, where the current amplitude of curve 222 (100 Arms) is twice that of curve 220 (50 Arms), and the current amplitude of curve 224 (200 Arms) is twice that of curve 222 (100 Arms).

The torque curves 220, 222, 224 are very steep when the angle is near the −D axis 210, 212 and quite flat near the +D axis 214 due to a saturation effect. The combination of the reluctance flux and the magnetic flux increases the overall saturation around the angle 214. In some cases (for this example, curve 220), the torque versus angle error curve is practically flat near the +D axis.

Figure 3:
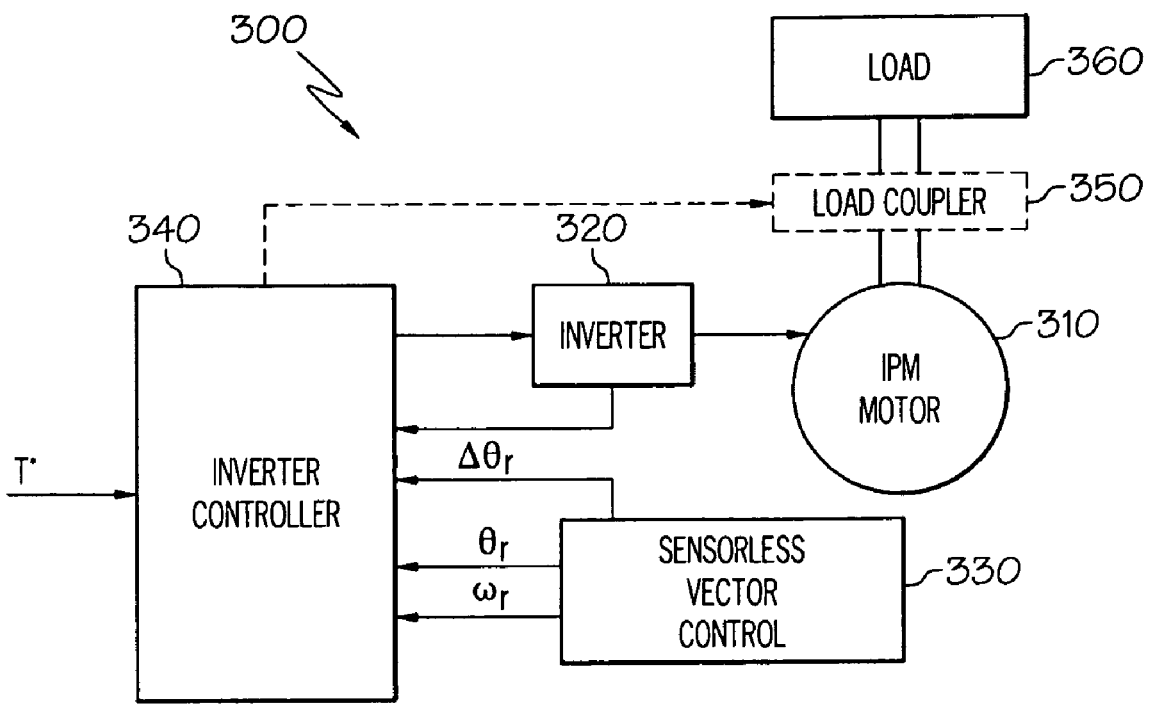
FIG. 3 illustrates a block diagram of an electric motor system in accordance with the embodiment of the present invention.

Referring to FIG. 3, an electric motor system 300 in accordance with the present embodiment includes an interior permanent magnet (IPM) motor 310 having a magnetic north associated therewith. An inverter 320 provides motor control signals to the IPM motor 310 for controlling its operation. A sensorless vector control device 330 is coupled to an airgap around the IPM motor for monitoring of the saliency of the IPM motor 310. The sensorless vector control device 330 determines a position of a rotor of the IPM motor in response to the saliency of the IPM motor 310 and generates a rotor position signal $\theta_r$ and an angular speed signal $\omega_r$.

An inverter controller 340 generates operational control signals for provision to the inverter 320 in response to the rotor position signal $\theta_r$ and the angular speed signal $\omega_r$ received from the sensorless vector control device 330 and in response to a torque command, T*, provided thereto.

The IPM motor 310 could be utilized in a pump, a compressor, or even an automobile electric drive, such as a hybrid drive motor. Detection of the motion of the rotor must be permissible in order to detect misalignment. In the case of pumps or compressors this does not present an issue because, since the load is speed dependent for pumps and fans, near zero speed the load is very small. For an automobile propulsion drive motor, however, either the motor should be disconnected from the rest of the system, i.e., a load 360, via clutches or other means to allow the IPM motor 310 to move during the test. Alternatively, sufficient gear lash should be provided to allow slight rotor movement without disturbing the load 360. In accordance with the preferred embodiment and for an automobile propulsion drive motor, the inverter controller 340 provides a load uncoupling signal and a load recoupling signal to a load coupler 350 for coupling and decoupling the load 360 from the IPM motor 310 in order to decouple the load 360 from the IPM motor 310 while the initial polarity detection routine of the sensorless vector control 330 is performed.

Figure 4:
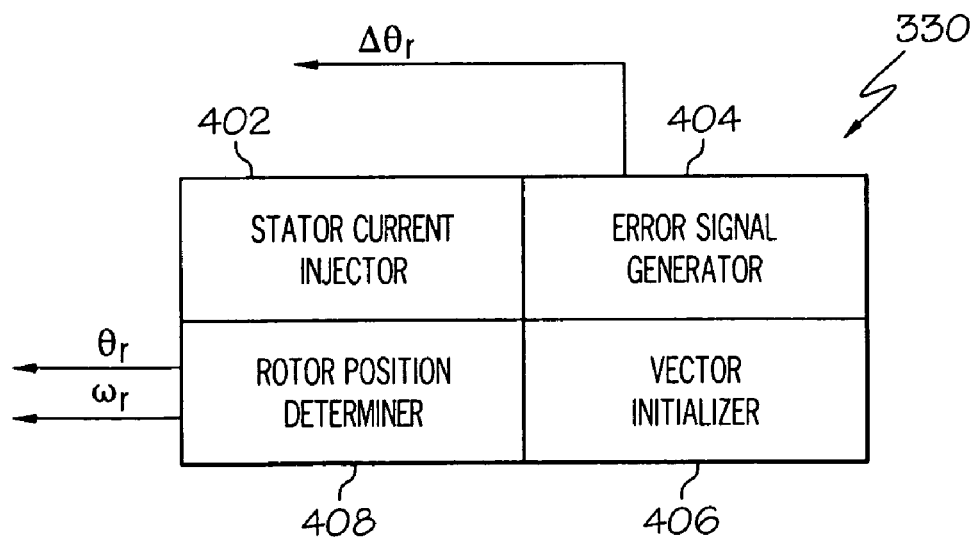
FIG. 4 illustrates a block diagram of a sensorless vector control of the electric motor system of FIG. 3 in accordance with the embodiment of the present invention.

Referring to FIG. 4, a more detailed block diagram of the sensorless vector control device 330 is depicted. While a block diagram is used in FIG. 4 to visualize the various functions of the sensorless vector control device 330, those skilled in the art will realize that some or all of these functional blocks represent signals, signal generation and/or software for performing the functions described hereinbelow. The sensorless vector control device 330 makes use of the different characteristics of the torque versus angle error curve (see curves 220, 222, 224 in FIG. 2) between the +D and −D axes. A stator current injector 402 injects a fixed amplitude stator current into the estimated +D axis. An error signal generator 404 provides an error signal to the stator current injector 402 to perturb a transformation angle by a predetermined motor-dependent angle, while a vector initializer block 406 monitors the speed feedback signal.

If the synchronous reference frame is correctly aligned to the magnet north pole of the rotor of the IPM motor 310, minimal torque disturbance is detected by the vector initializer block 406 due to the angle perturbation since the torque characteristic is practically flat near the +D axis. However, if the synchronous reference frame is incorrectly aligned to the south pole of the rotor of the IPM motor 310, then a large torque disturbance is detected by the vector initializer block 406 when perturbing the transformation angle, resulting in slight (but detectable) motion of the rotor of the IPM motor 310. In this manner, the vector initializer block 406 sets a control reference axis to either 180° added to the estimated reference axis if the resulting speed of the IPM motor 310 is greater than a predetermined threshold speed or to the estimated reference axis if the resulting speed of the IPM motor 310 is less than or equal to the predetermined threshold speed. A rotor position determiner block 408 thereafter determines the position of the rotor of the IPM motor in response to the control reference axis and the saliency of the IPM motor and generates the rotor position signal $\theta_r$ and the angular speed signal $\omega_r$.

The vector initializer block 406 monitors the rotor initially when it is at rest. Thereafter, when the error signal generator 404 perturbs the estimated reference axis by a predetermined transformation angle (e.g., plus or minus 45°) which will vary in response to the design of the motor 310, and the vector initializer block 406 monitors that the speed feedback signal exceeds a predefined threshold, then the initial position estimate is assumed to be incorrectly aligned to the magnet south pole. In accordance with the present embodiment, the vector initializer block 406 adds 180° to the resolver position and resumes normal motor control. If the vector initializer block 406 determines that the speed feedback signal remains at or below the predefined threshold, the synchronous reference frame is determined to be correctly aligned, and the vector initializer block 406 proceeds with normal motor control with no adjustment necessary.

Figure 5:
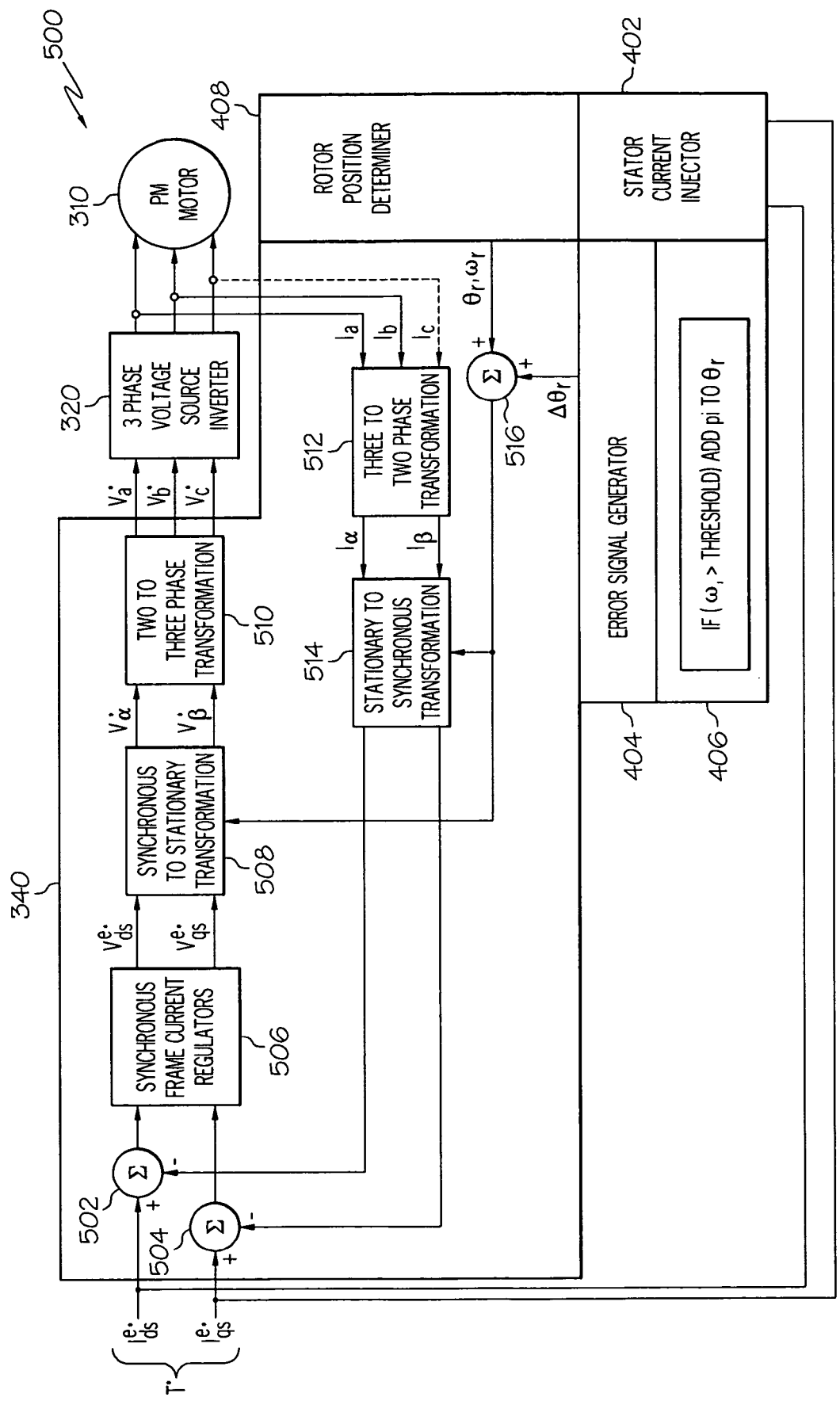
FIG. 5 illustrates more detailed block diagram of the electric motor system of FIG. 3 in accordance with the embodiment of the present invention.

Referring to FIG. 5, a block diagram 500 of a typical vector controlled current regulated motor drive with the proposed initial polarity detection scheme is depicted. Current commands generated from the torque command T* in the synchronous reference frame, $I_{ds}^{e*}$ and $I_{qs}^{e*}$, are each provided to one of summing junctions 502 and 504. Feedback currents $I_{ds}^{e}$ and $I_{qs}^{e}$ are also fed to the summing junctions 502, 504. The output of the summing junctions 502, 504 are processed by synchronous frame current regulators 506 to generate synchronous frame voltage commands $V_{ds}^{e*}$ and $V_{qs}^{e*}$. These voltage commands $V_{ds}^{e*}$ and $V_{qs}^{e*}$ are converted by a synchronous to stationary transformation module 508, which uses rotor position $\theta_r$ to transform the voltage commands from the synchronous reference frame to the stationary reference frame in accordance with a conventional coordinate transformation.

The outputs of the transformation module 508 are the stationary frame two phase alpha/beta voltage commands $V_\alpha^*$ and $V_\beta^*$. The alpha/beta voltage commands are then passed to the two phase to three phase transformation block 510, which converts the alpha/beta voltage commands to the equivalent 3-phase signals $V_a^*$, $V_b^*$, and $V_c^*$. The 3-phase stationary frame voltage commands $V_a^*$, $V_b^*$, $V_c^*$ are the operational control signals passed to the 3-phase voltage source inverter 320, which processes the voltage commands and applies the commanded voltages to stator windings of the IPM motor 310.

Two (or three) stator phase currents are sensed and passed to a three to two phase transformation module 512 of the inverter controller 340. The three to two phase transformation module 512 converts the three phase currents $I_a$, $I_b$ and $I_c$ to equivalent two phase alpha/beta currents $I_\alpha$ and $I_\beta$, and a stationary to synchronous transformation module 514 utilizes the rotor position $\theta_r$ to transform the alpha/beta currents to synchronous frame quantities $I_{ds}^{e}$ and $I_{qs}^{e}$, which are then provided to the summers 502, 504.

In accordance with the present embodiment, the stator current injector 402 sets the d-axis current, $i_{ds}^{e}$, to a fixed value (for example, 50 Arms), while the q-axis current, $i_{qs}^{e}$, is set to zero. The transformation angle is perturbed by the error signal generator 404 providing the rectangular pulse train $\Delta\theta_r$ to a summing junction 516 for introducing the predetermined error, $\Delta\theta_r$, on the d-axis. The vector initializer 406 performs the test on the angular speed $\omega_r$ to determine whether the reference frame is correctly aligned or not. If the speed exceeds the predetermined threshold, then 180° is added to the reference frame angle.

Figure 6:
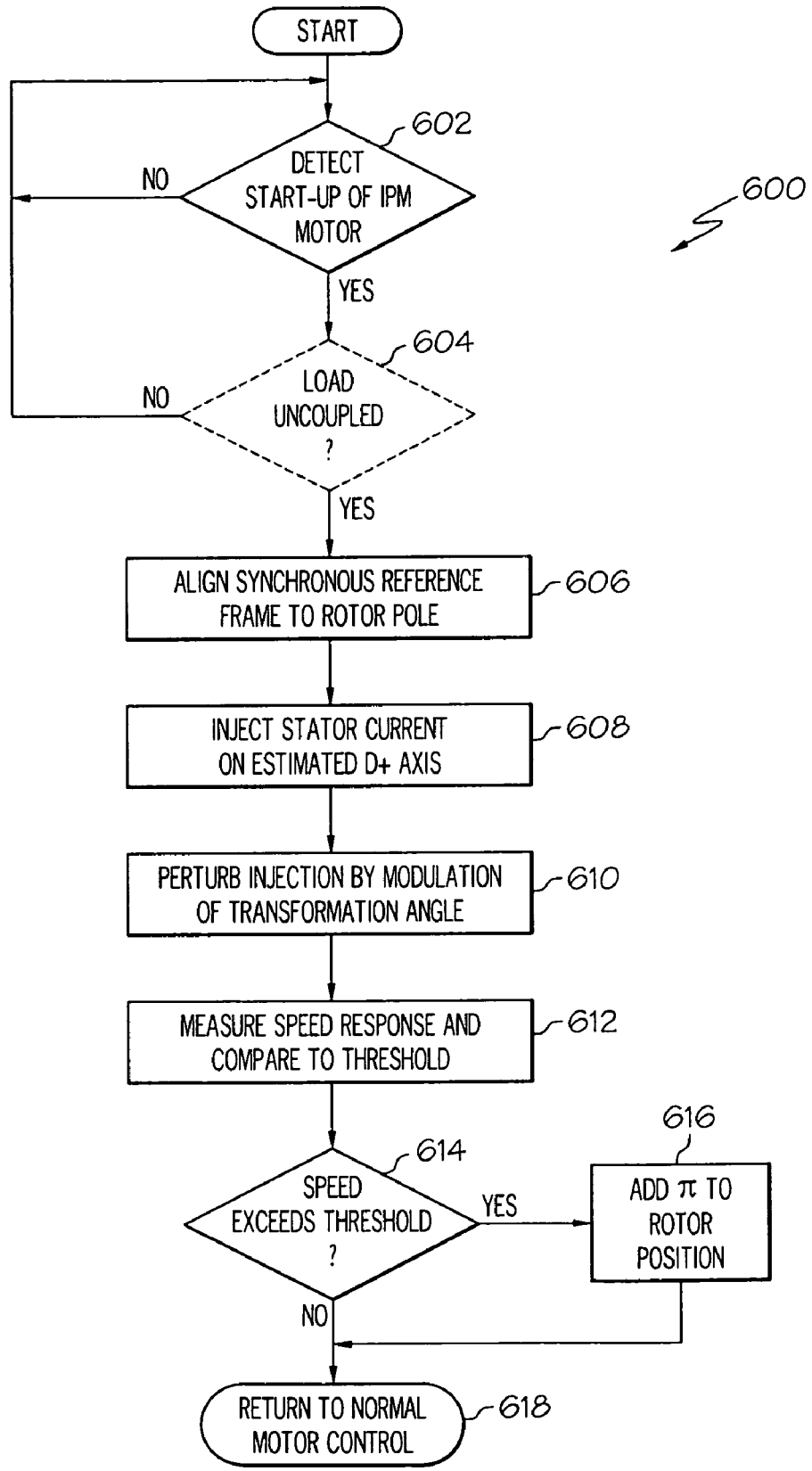
FIG. 6 illustrates flowchart of an initial polarity detection routine of the sensorless vector control of FIG. 4 in accordance with the embodiment of the present invention.

Referring to FIG. 6, a flow chart 600 describes the method of the sensorless vector control 330 for initial polarity detection in accordance with the present embodiment which begins by awaiting detection of activation 602 of the IPM motor 310 (i.e., turning the motor ON). When the sensorless vector control 330 determines 602 that the IPM motor 310 has been activated, the sensorless vector control 330 determines 604 whether the IPM motor 310 has been uncoupled from its load 360 as the torque disturbance which may occur could provide such disturbances to the load 360 unless the load 360 is uncoupled. Step 604 may not be needed for certain applications such as compressors or pumps as discussed above.

When the sensorless vector control determines 604 that the load 360 is uncoupled from the IPM motor 310, the synchronous reference frame is aligned 606 to a magnetic pole of the IPM motor 310 using any one of several prior art position sensorless techniques known to those skilled in the art. Then, the stator current injector 402 injects a stator current onto the estimated +D axis 608. The injection is perturbed 610 by the error signal generator 404 providing an error signal to the stator current injector 402 to modulate the transformation angle.

In accordance with the preferred embodiment, the transformation angle is modified by an error signal that is a square wave pulse train of angular error. The pulse train error signal is generated by the error signal generator 404 for a sufficient duration to detect any speed variation in the IPM motor 310. The amplitude of the pulse train error signal should be sufficiently small to remain in the flat area of the torque curve 220, 222, 224 as seen in FIG. 2. For example, with the 50 Arms curve 220 near 180 degrees, the angular error should be restricted to less than ±40 degrees to remain within the flat torque vs. angular error portion of the curve 220.

However, the pulse train error signal amplitude should be sufficiently large to allow speed detection based upon the expected torque disturbance assuming the frame is incorrectly aligned to the magnet south pole. The duration of the pulse is then selected to be sufficiently wide to allow speed detection in the event the frame is incorrectly aligned to the magnet south pole. Equation 6 shows the relation between torque, angular velocity, and inertia:

$$T_e = J\frac{d\omega_r}{dt} \approx J\frac{\Delta\omega_r}{\Delta t} \tag{6}$$

where $\Delta t$ is the pulse width in seconds and J is the inertia of the motor in kg*m². The speed threshold should be selected to be sufficiently above the expected noise floor, while providing a sufficient margin to prevent false detection. In the case of incorrect alignment, the pulse amplitude will determine the magnitude of torque, while the pulse width will determine the resultant speed as seen in Equation 7.

$$\Delta\omega_r \approx \frac{T_e \Delta t}{J} \tag{7}$$

The first and last pulses may be selected to be one-half of the width of the nominal pulses to insure a zero mean of the angle perturbation. In this manner, even if the rotor was initially incorrectly aligned, the resultant motion would be purely AC in nature and average displacement of the rotor would be about zero (i.e., the starting position would be approximately the same as the ending position).

While the position is perturbed, the vector initializer monitors 612 the angular speed of the rotor and determines 614 whether the speed exceeds a predetermined threshold speed. If the speed does not exceed the predetermined threshold 614, then, in accordance with the present embodiment, the reference frame is determined to be correctly aligned to the magnet north pole and no adjustment is necessary. However, if the speed exceeds the predetermined threshold 614, it is determined that the reference frame was incorrectly aligned to the magnet south pole and 180° is added to the synchronous reference frame 616 before normal control of the IPM motor 310 can resume 618, including recoupling the IPM motor 310 to its load 360.

Figure 7A:
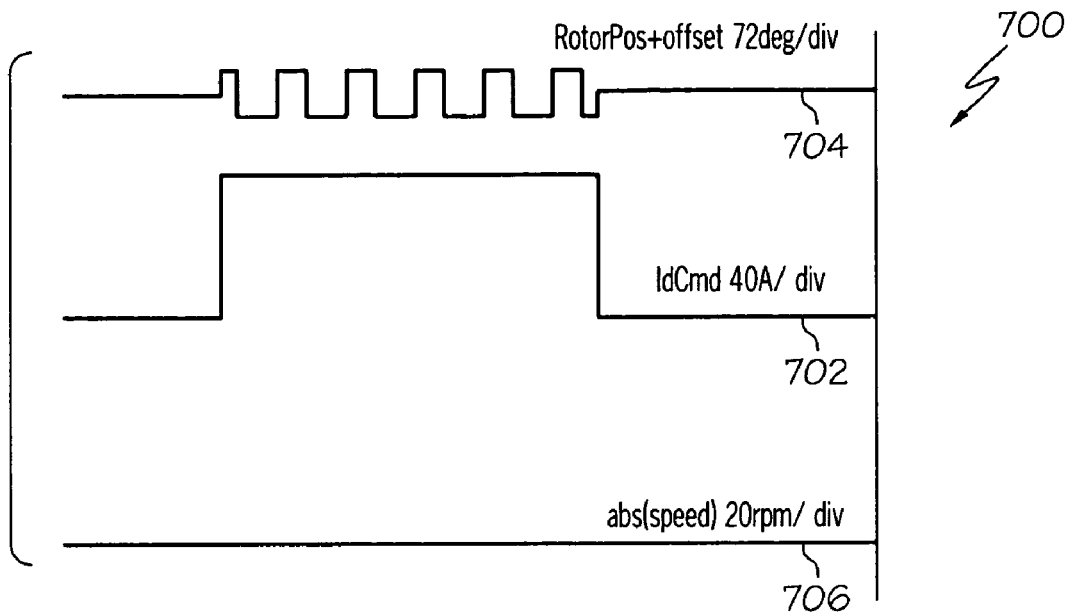
Figure 7B:
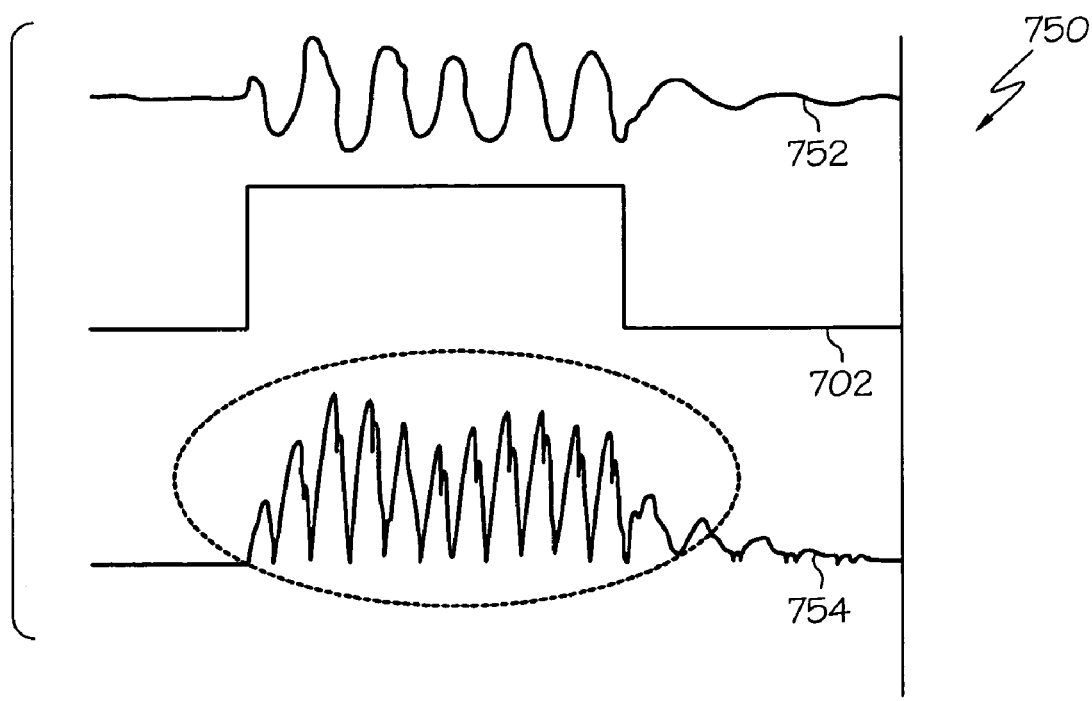

Referring next to FIG. 7, including FIGS. 7A and 7B, two graphs 700, 750 illustrate the present embodiment in operation. Graph 700 depicts the case where the reference frame was initially aligned to the correct magnet north pole. Fifty Arms was injected as signal 702 into the estimated +D axis and the rotor position was perturbed by a square wave pulse train having a 166.6 msec period and ±20 degree amplitude, where signal 704 depicts the estimated rotor position plus the square wave pulse train. The detected motor speed on curve 706 remains practically zero during the entire test period.

Referring next to graph 750 (FIG. 7B), the case where the reference frame was incorrectly aligned to the magnet south pole is depicted. The perturbation square wave pulse train, where signal 752 depicts the estimated rotor position plus the square wave pulse train, results in torque disturbance, which in turn results in rotor movement. The detected speed signal 754 is in excess of twenty rpms, and can easily be detected via software. Thus, the vector initializer 406 can easily detect the speed signal 754 and add 180° to the reference frame (step 616, FIG. 6) before resuming normal control (step 618, FIG. 6), as the speed signal 754 provides a high signal-to-noise ratio, thereby providing a reliable means for the vector initializer 406 to detect reference frame alignment.

Thus it can be seen that the sensorless vector control 330 in accordance with the present embodiment provides a method and apparatus for rapidly detecting rotor magnet polarity for the IPM motor 310 at start-up for electric motor systems 300 using position sensorless vector control 330. The technique can be performed rapidly and with minimal disturbance to the rotor position. Magnet alignment detection is facilitated by the high signal-to-noise ratio of the speed signal 754, allowing initial polarity detection to be accomplished rapidly while minimizing disturbance to the rotor position and IPM motor 310 acoustic noise.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for aligning a control reference axis with a magnetic north of a permanent magnet motor comprising the steps of:
   injecting a predetermined stator current on an estimated reference axis of the permanent magnet motor;
   introducing predetermined error on the estimated reference axis;
   determining if a speed of the permanent magnet motor is greater than a predetermined threshold speed; and
   setting the control reference axis to 180° added to the estimated reference axis if the speed of the permanent magnet motor is greater than the predetermined threshold speed.

2. The method in accordance with claim 1 further comprising the step of setting the control reference axis to the estimated reference axis if the speed of the permanent magnet motor is less than or equal to the predetermined threshold speed.

3. The method in accordance with claim 2 wherein the permanent magnet motor is coupled to a load for operation thereof, and
   wherein the step of injecting the predetermined stator current comprises the steps of:
   uncoupling the load from the permanent magnet motor in response to activation of the permanent magnet motor; and
   injecting the predetermined stator current on the estimated reference axis,
   the method further comprising the step of recoupling the load to the permanent magnet motor after the steps of setting the control reference axis.

4. The method in accordance with claim 1 wherein the step of injecting the predetermined stator current comprises the step of injecting the predetermined stator current on the estimated reference axis in response to activation of the permanent magnet motor.

5. The method in accordance with claim 1 wherein the step of determining the speed of the permanent magnet motor comprises the step of monitoring a permanent magnet rotor speed feedback signal to determine if the speed of the permanent magnet motor is greater than the predetermined threshold speed.

6. The method in accordance with claim 1 wherein the step of introducing predetermined error comprises the step of perturbing the estimated reference axis by a predetermined transformation angle.

7. The method in accordance with claim 6 wherein the step of perturbing the estimated reference angle comprises the step of modulating the transformation angle of the estimated reference axis by plus or minus a predetermined angle.

8. A sensorless vector control for initializing a rotor position signal corresponding to a position of a rotor for a permanent magnet motor, the apparatus comprising:
   a stator current injector for injecting a predetermined stator current on an estimated reference axis of the permanent magnet motor;
   an error signal generator coupled to the stator current injector for providing an error signal to the stator current injector for introducing predetermined error on the estimated reference axis; and
   a vector initializer for determining if a speed of the permanent magnet motor is greater than a predetermined threshold speed after the predetermined error is introduced, the vector initializer setting the control reference axis for the position sensorless vector control to 180° added to the estimated reference axis if the speed of the permanent magnet motor is greater than the predetermined threshold speed and setting the control reference axis for the position sensorless vector control to the estimated reference axis if the speed of the permanent magnet motor is less than or equal to the predetermined threshold speed.

9. The sensorless vector control in accordance with claim 8 further comprising a rotor position determiner coupled to the vector initializer and determining the position of the rotor of the IPM motor in response to the control reference axis.

10. The sensorless vector control in accordance with claim 8 wherein the vector initializer monitors a permanent magnet rotor speed feedback signal to determine if the speed of the permanent magnet motor is greater than the predetermined threshold speed or less than or equal to the predetermined threshold speed.

11. The apparatus in accordance with claim 8 wherein the error signal generator generates the error signal to perturb the estimated reference axis by a predetermined transformation angle.

12. The apparatus in accordance with claim 11 wherein the error signal generator generates the error signal to perturb the estimated reference axis by modulating the transformation angle of the estimated reference axis by plus or minus a predetermined angle.

13. An electric motor system comprising:
   an interior permanent magnet (IPM) motor having a magnetic north associated therewith;
   an inverter coupled to the IPM motor for providing motor control signals to the IPM motor for controlling the operation thereof,
   a sensorless vector control coupled to the IPM motor for determining a saliency of the IPM motor and generating a rotor position signal and an angular speed signal in response to the saliency of the IPM motor;
   an inverter controller coupled to the sensorless vector control and the inverter for generating operational control signals in response to the rotor position signal and the angular speed signal and providing the operational control signals to the inverter for controlling the operation thereof,
   wherein the sensorless vector control comprises:
      a stator current injector for injecting a predetermined stator current on an estimated reference axis of the IPM motor;
      an error signal generator coupled to the stator current injector for providing an error signal to the stator current injector for introducing predetermined error on the estimated reference axis;
      a vector initializer for determining if an angular speed of the IPM motor is greater than a predetermined threshold speed after the predetermined error is introduced, the vector initializer setting a control reference axis to 180° added to the estimated reference axis if the speed of the IPM motor is greater than the predetermined threshold speed; and
      a rotor position determiner coupled to the vector initializer and the IPM motor and determining the position of the rotor of the IPM motor in response to the control reference axis and the saliency of the IPM motor.

14. The electric motor system in accordance with claim 13 wherein the vector initializer sets the control reference axis to the estimated reference axis if the speed of the IPM motor is less than or equal to the predetermined threshold speed.

15. The electric motor system in accordance with claim 14 wherein the vector initializer monitors a permanent magnet rotor speed feedback signal to determine if the speed of the IPM motor is greater than the predetermined threshold speed or less than or equal to the predetermined threshold speed.

16. The electric motor system in accordance with claim 13 wherein the inverter controller provides a rotor position determination signal to the stator current injector for initiating injection of the predetermined stator current on the estimated reference axis of the IPM motor in response to detection of activation of the IPM motor.

17. The electric motor system in accordance with claim 16 further comprising a load coupler for coupling the IPM motor to a load for operation thereof, wherein the inverter controller is coupled to the load coupler and provides a load uncoupling signal thereto after detecting activation of the IPM motor and before providing the rotor position determination signal to the stator current injector, the inverter controller providing a load recoupling signal to the load coupler for recoupling the load to the IPM motor after determining that the sensorless vector control has set the control reference axis for the position sensorless vector control.

18. The electric motor system in accordance with claim 13 wherein the error signal generator generates the error signal to perturb the estimated reference axis by a predetermined transformation angle.

19. The electric motor system in accordance with claim 18 wherein the error signal generator generates the error signal to perturb the estimated reference axis by modulating the transformation angle of the estimated reference axis by plus or minus a predetermined angle.

20. The electric motor system in accordance with claim 13 wherein the IPM motor comprises an electric motor selected from the group of electric motors including pump motors, compressor motors, automotive electric drive motors and automotive hybrid drive motors.

* * * * *